H. A. HENZE.
MOTOR METER.
APPLICATION FILED NOV. 18, 1919.

1,409,105.

Patented Mar. 7, 1922.

INVENTOR
Hubert A. Henze.
BY
Victor J. Evans,
ATTORNEY

UNITED STATES PATENT OFFICE.

HUBERT A. HENZE, OF BROOKLYN, NEW YORK.

MOTOR METER.

1,409,105.  Specification of Letters Patent.  Patented Mar. 7, 1922.

Application filed November 18, 1919. Serial No. 338,842.

*To all whom it may concern:*

Be it known that I, HUBERT A. HENZE, a citizen of Germany, residing at Brooklyn, in the county of Kings and State of New York, have invented new and useful Improvements in Motor Meters, of which the following is a specification.

This invention relates to what are commercially known as motor meters, and particularly to that type operating in conjunction with internal combustion motors to indicate or disclose, visually or otherwise, the temperature conditions of the cooling or circulating water.

Motor meters of the above described character generally consist of a thermometer in which the bulb is adapted to be extended into the space above the water level in the radiator of an internal combustion motor or brought into direct contact with or immersed in the body of circulating water so that as the temperature rises or lowers the expansible liquid contained in the stem of the thermometer will be made to co-act with an arbitrary scale. The construction of these devices is generally such that a reading of the condition of the thermometer can be accomplished in daylight but not in darkness.

An object of my invention is to provide means which may be employed in combination with the present form of motor meter so as to not interfere in any manner with the normal working of the thermometer when conveying indications thereof during the day time but which will serve to cause the conditions of the thermometer to be fully visualized when a reading is desired at nighttime.

Another object of the invention is to provide a motor meter having means for causing the scale markings to be rendered clearly visible at night time as well as daytime, said means including a lamp which effectuates the above purpose and which serves in addition thereto as a head light for the automobile with which the invention is incorporated.

In the drawings:—

Figure 1:
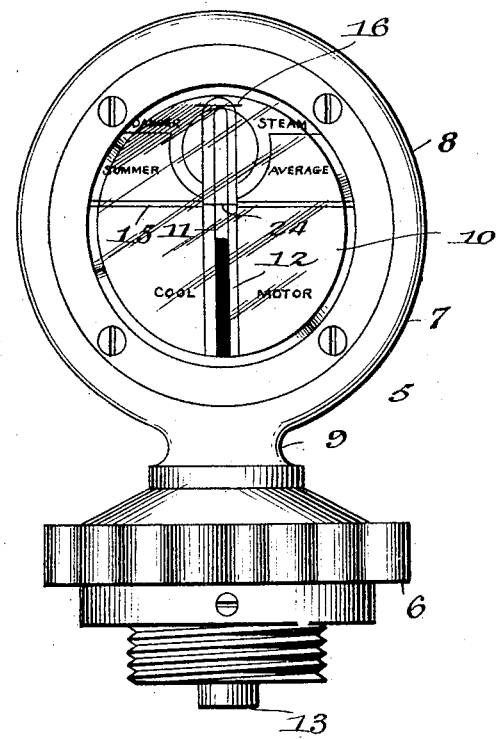
Figure 1, is a front view of the motor meter.
Figure 2:
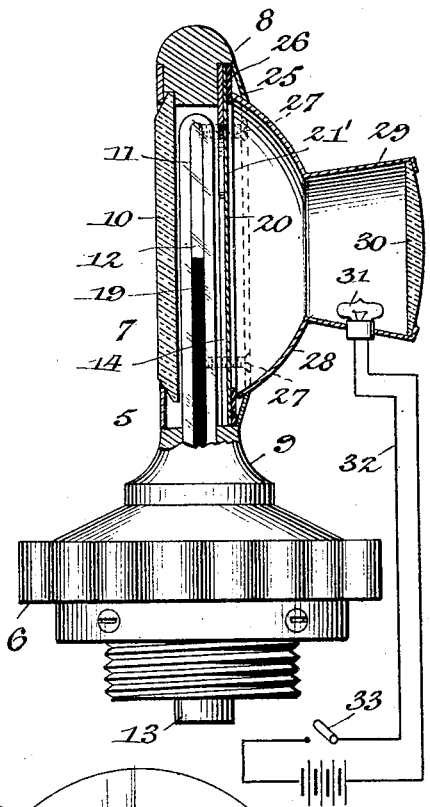
Figure 2 is a side view of the meter with parts in section.
Figure 3:
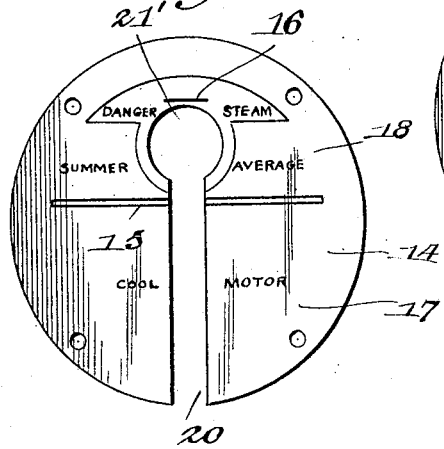
Figure 3 is a plan view of the scale plate.
Figure 4:
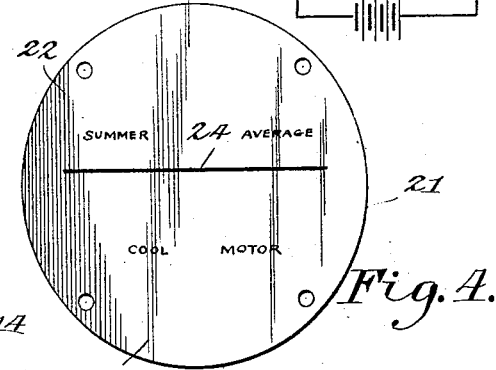
Figure 4 is a plan view of the translucent scale plate.

In carrying the invention into practice, I will describe certain details of a commercial form of motor meter and will associate its essential working parts with the parts constituting my improvements. While the invention will be described in combination with a thermometer of the type employing a liquid expanding substance, such as alcohol or mercury, I wish it to be understood that I do not care to limit myself in this respect.

The motor meter 5 consists of a cap 6 adapted to be mounted in the customary manner upon the radiator of an internal combustion motor. Mounted upon the cap is a casing 7 which consists of a ring-like body 8 having a reduced base 9 which is directly secured to the top of the cap 6 so that the ring is supported in a vertical position. At the rear, the ring is covered by a glass lens or panel 10. Extending into the ring at a point in front of the panel 10 is the stem 11 of a thermometer 12, said thermometer having its bulb 13 disposed below the base of the cap 6 so that when the cap is applied to the radiator the bulb 13 will be arranged in the space above the water level. As previously stated herein, the present arrangement is merely suggestive of one manner in which temperature indications can be taken and whether the bulb 13 is extended merely into the space above the water level or brought into direct contact with or immersed in the water is entirely immaterial.

At the front of the stem 11 of the thermometer is an opaque scale plate or surface 14 having suitable markings 15 and 16 which sub-divide the stem into fields 17 and 18, the former for representing low temperatures and the latter high temperatures. In order that the thread channel 19 of the stem 11 will be made properly visible, the plate 14 is provided with a slot 20 which operates to permit light to be conveyed against the front of said stem. The slot 20 is preferably provided with a circular branch 21' arranged in the high temperature field 18.

At the front of the scale plate 14 is a second translucent disk 21 which is preferably formed of paper and the same is divided into fields 22 and 23 by a line of demarkation 24 arranged in registration with the line 15 on the plate 14. At the front of the disk 21 is a retaining ring 25 which is adapted to be clamped against a gasket 26 by means of fastenings 27, the latter arranged to enter the body portion or ring 8 hereinbefore described. A truncated conoidal reflector 28 is arranged directly in front of the transparent panel 10, the large end of the reflector being clamped in position against the ring 8 by means of the member 25. At the restricted end of the reflector is a lens carrying tube 29. This tube is preferably flared and at the large forward end thereof it is provided with a lens 30. Within the tube is an incandescent lamp 31 which is arranged in an electric circuit 32 wherein is included a suitable manually controlled switch 33 whereby the circuit can be opened or closed as the occasion requires.

By arranging the semi-transparent disk 21 forwardly of the scale plate 14, I find that objectionable light shadows or light streaks caused by reflection and refraction of the light from stem 11 or other parts, are eliminated from around the stem of the thermometer so that the scale markings will not be obliterated by light shadows or otherwise affected in a manner which would convey inaccurate conditions of the thermometer. The lens carrying tube of the reflector 28 is arranged preferably in line with the horizontal center of the casing 7 so that daylight will be conveyed against the semi-transparent disk 21 to visualize the fields 22 and 23 thereof, thus augmenting the action or purpose of the fields 17 and 18, on the scale disk 14. When a reading of the thermometer is desired at nighttime, the electric circuit 32 may be closed so that the lamp 31 will be lighted and rays of light cast upon the semi-transparent disk 21 to fully visualize the respective fields 22 and 23 with which the expansible liquid in the stem of the thermometer is adapted to co-act. The position of the front lens 30 is such that the device can be used as an effective and ornamental head lamp for an automobile, the position of the lens being such that rays of light will be cast respectively in a forward direction to permit the automobile to be seen when it is parked or left standing on the highway, and in a rearward direction for causing the semi-transparent disk 21 to be illuminated for the purpose previously mentioned.

What is claimed as new is:—

1. An instrument of the class described comprising, a thermometer including a scale surface for indicating various temperatures of the cooling medium of an engine, a translucent scale surface arranged in front of the first said scale surface and marked to correspond with the markings thereof, and means for casting light rays against the translucent surface to illuminate the stem of the thermometer and cause said markings of the translucent surface to appear in matched relation with the markings of the first said surface.

2. An instrument of the class described comprising, a thermometer including a scale surface for indicating various temperatures of the cooling medium of an engine, a translucent scale surface arranged in front of the first said scale surface and marked to correspond with the markings thereof, means for casting light rays against the translucent surface to illuminate the stem of the thermometer and cause said markings of the translucent surface to appear in matched relation with the markings of the first said surface, said means including an electric circuit, and a lamp in said circuit.

3. An instrument of the class described comprising, a thermometer including a scale surface for indicating various temperatures of the cooling medium of an engine, a translucent scale surface arranged in front of the first said scale surface and marked to correspond with the markings thereof, means for casting light rays against the translucent surface to illuminate the stem of the thermometer and cause said markings of the translucent surface to appear in matched relation with the markings of the first said surface, said means including an electric circuit, a lamp in said circuit, and a controlling switch in said circuit.

4. An instrument of the class described comprising, a thermometer including a scale surface for indicating various temperatures of the cooling medium of an engine, a translucent scale surface arranged in front of the first said scale surface and marked to correspond with the markings thereof, means for casting light rays against the second surface to illuminate the stem of the thermometer and cause said markings of the translucent surface to appear in matched relation with the markings of the first said surface, said means comprising a lamp disposed in front of said translucent surface.

5. An instrument of the class described comprising, a thermometer including a scale surface for indicating various temperatures of the cooling medium of an engine, a translucent scale surface arranged in front of the first said scale surface and marked to correspond with the markings thereof, means for casting light rays against the second surface to illuminate the stem of the thermometer and cause said markings of the translucent surface to appear in matched relation with the markings of the first said surface, said means comprising a reflector, a lens carried by the reflector, and a lamp between the lens and said translucent surface.

6. An instrument of the class described comprising a thermometer including an opaque scale surface for indicating various temperatures of the cooling medium of an engine and slotted to accommodate the stem of the thermometer, a translucent scale surface, and means for casting light reflections against said translucent surface and toward the stem so as to cause the markings of said translucent surface to appear in register with the markings of the opaque surface.

7. An instrument of the class described comprising a thermometer including an opaque scale surface for indicating various temperatures of the cooling medium of an engine and slotted to accommodate the stem of the thermometer, a translucent scale surface covering the slot and arranged in front of the first surface and having its markings in horizontal registration with the markings of the said first surface, and means for casting light reflections against the translucent surface to illuminate the markings thereof and visually correlate the same with the liquid column in the stem of the thermometer.

In testimony whereof I have affixed my signature.

HUBERT A. HENZE.